US009692801B2

(12) United States Patent
Jung et al.

(10) Patent No.: US 9,692,801 B2
(45) Date of Patent: Jun. 27, 2017

(54) METHOD AND APPARATUS FOR CONTROLLING TRAFFIC USING ADAPTIVE STREAMING IN MULTI-MEDIA CONTENT TRANSMISSION SYSTEM

(71) Applicant: Samsung Electronics Co., Ltd., Suwon-si, Gyeonggi-do (KR)

(72) Inventors: Bo-Sun Jung, Seongnam-si (KR); Sung-Ryeul Rhyu, Yongin-si (KR); Jae-Yeon Song, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 336 days.

(21) Appl. No.: 14/363,364

(22) PCT Filed: Dec. 5, 2012

(86) PCT No.: PCT/KR2012/010482
§ 371 (c)(1),
(2) Date: Sep. 30, 2014

(87) PCT Pub. No.: WO2013/085279
PCT Pub. Date: Jun. 13, 2013

(65) Prior Publication Data
US 2015/0039721 A1 Feb. 5, 2015

(30) Foreign Application Priority Data
Dec. 6, 2011 (KR) ........................ 10-2011-0129916

(51) Int. Cl.
*G06F 15/16* (2006.01)
*H04L 29/06* (2006.01)
(Continued)

(52) U.S. Cl.
CPC ............ *H04L 65/602* (2013.01); *H04L 47/38* (2013.01); *H04L 65/4069* (2013.01);
(Continued)

(58) Field of Classification Search
CPC ..... H04L 65/602; H04L 65/608; H04L 47/38; H04L 65/605; H04L 65/4069;
(Continued)

(56) References Cited

U.S. PATENT DOCUMENTS

2004/0148423 A1 7/2004 Key et al.
2005/0076136 A1 4/2005 Cho et al.
(Continued)

FOREIGN PATENT DOCUMENTS

KR 10-2003-0067270 A 8/2003
KR 10-2004-0025994 A 3/2004
(Continued)

*Primary Examiner* — Cheikh Ndiaye
(74) *Attorney, Agent, or Firm* — Jefferson IP Law, LLP

(57) ABSTRACT

A method for network operators to control traffic between a server and a client so that client-induced traffic preemption may be prevented is provided. The method includes the processes of an operator determining a network status, the network in which a server is streaming content via a multi-media transmission system, in accordance with a status of the network, determining whether to modify meta data by considering a set of predetermined conditions, and transmitting to a terminal data reflecting the modification decision.

20 Claims, 7 Drawing Sheets

(51) Int. Cl.
*H04L 12/811* (2013.01)
*H04L 12/26* (2006.01)

(52) U.S. Cl.
CPC .......... *H04L 65/605* (2013.01); *H04L 65/607* (2013.01); *H04L 65/608* (2013.01); *H04L 65/80* (2013.01); *H04L 43/0876* (2013.01)

(58) Field of Classification Search
CPC ... H04L 65/80; H04L 65/607; H04L 43/0876; H04L 29/06
See application file for complete search history.

(56) References Cited

U.S. PATENT DOCUMENTS

2010/0268836 A1 10/2010 Jabri et al.
2011/0082924 A1* 4/2011 Gopalakrishnan .. H04L 65/4084 709/223
2011/0179186 A1* 7/2011 Li ...................... H04L 65/4084 709/231
2011/0196982 A1 8/2011 Chen et al.
2011/0283015 A1 11/2011 Melnyk et al.
2011/0314130 A1* 12/2011 Strasman ................ H04L 29/06 709/219
2012/0042090 A1* 2/2012 Chen ..................... H04L 65/607 709/231
2012/0084454 A1* 4/2012 Lindquist ........... H04N 7/17318 709/231
2013/0091249 A1* 4/2013 McHugh .......... H04N 21/23439 709/219
2013/0246643 A1* 9/2013 Luby ................ H04N 21/23439 709/231

FOREIGN PATENT DOCUMENTS

KR 10-2004-0068880 A 8/2004
WO 2011-044287 A1 4/2011

* cited by examiner

METHOD AND APPARATUS FOR CONTROLLING TRAFFIC USING ADAPTIVE STREAMING IN MULTI-MEDIA CONTENT TRANSMISSION SYSTEM

CROSS-REFERENCE TO RELATED APPLICATION(S)

This application is a U.S. National Stage application under 35 U.S.C. §371 of an International application filed on Dec. 5, 2012 and assigned application number PCT/KR2012/010482, which claimed the benefit of a Korean patent application filed on Dec. 6, 2011 in the Korean Intellectual Property Office and assigned Serial number 10-2011-0129916, the entire disclosure of which is hereby incorporated by reference.

TECHNICAL FIELD

The present disclosure relates to a method and an apparatus for controlling traffic using adaptive streaming in a multimedia content transmission system.

BACKGROUND

In recent years, with an increase in the use of online content, smooth content transmission has become important. Accordingly, there is active discussion of adaptive streaming technology in which a bit rate of content is adaptively changed according to a usable transmission bandwidth or a change in an apparatus performance of a user.

There is a dynamic adaptive streaming over hypertext transfer protocol (HTTP) (DASH) which corresponds to a representative technology of adaptive streaming. The DASH is a technology related to a method of configuring content and a method of transmitting the configured content. Hereinafter, a broadcasting communication system using the DASH technology will be described with reference to FIG. 1.

FIG. 1 is a block diagram illustrating a broadcasting communication system using the DASH technology according to the related art.

Referring to FIG. 1, the broadcasting communication system includes a server 100 and a client 120. The server 100 and the client 120 communicate with each other through a communication network 130. For example, the server 100 may provide a DASH content 110 to a user, and the DASH content 110 is configured as follows.

The DASH content 110 includes a media segment belonging to a representation 110*a* and an adaptation set 110*b*, and metadata 110*c*. The representation 110*a* indicates a row of media segments having different image qualities, different resolutions, different bit rates, etc., and the adaptive set 110*b* is obtained by grouping a plurality of representations. Here, the number of the representations 110*a* and the number of the adaptive sets 110*b* may be larger than one. The metadata 110*c* includes information on a relation between the representation 110*a* and the adaptive set 110*b*.

The client 120 receives metadata 110*c* and determines which adaptive set should be reproduced. Further, the client 120 selects one of the plurality of representations in the determined adaptive set, based on the network situation and the capability of a reproduction device in the client 120. Next, the client 120 downloads the selected representations from the server 110 and reproduces the downloaded representations.

FIG. 2 illustrates an example where the DASH content is provided, in a broadcasting communication system according to the related art.

The DASH technology uses a client control streaming scheme in which streaming is controlled by the client, instead of a server control streaming scheme in which streaming is controlled by a server.

When the server control streaming scheme is used, a server 200 transmits optimal content according to each network situation for each client based on information on the client 210 connected thereto. However, as illustrated in FIG. 2, the server 200 is overloaded as the number of the clients increases.

Meanwhile, when the client control streaming scheme based on the DASH technology is used, the server 200 may generate a plurality of media segments and a plurality of pieces of metadata which can be used according to each network situation. Then, the client directly selects and reproduces content according to a current network situation, so as to download and reproduce optimal content according to the network situation without a load of the server 200.

However, since all of the clients use maximal amount of traffic according to their own network situations, there is a problem in that an amount of network traffic increases even when there are a small number of clients. Further, implementation of a DASH client logic of the client is in a region of the reproduction device, and there is no control method which a communication network can use in order to decrease the amount of the network traffic.

Further, the server 200 merely provides the content, and has a difficulty to configure content for a specific communication network (as an example, a communication network having a large amount of traffic). The reason is that a plurality of different communication networks may exist between the clients, so that it is unreasonable that the content is configured only for a specific communication network. Further, there is a problem in that reconfiguring of the content according to a network situation does not comport with the original purpose of the DASH technology.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide a method and an apparatus for controlling traffic using adaptive streaming in a multimedia content transmission system.

Another aspect of the present disclosure is to provide a method and an apparatus for preventing traffic reduction generated due to an excessive connection increase of clients in a multimedia content transmission system using Dynamic Adaptive Streaming over Hypertext Transfer Protocol (HTTP) (DASH) technology.

Another aspect of the present disclosure is to provide a method and an apparatus for controlling traffic between a content provider server and a client, by a communication network device, in a multimedia content transmission system using DASH technology.

In accordance with an aspect of the present disclosure, a method for controlling traffic by a communication network device in a multimedia content transmission system is provided. The method includes receiving, from a content providing server, metadata including information on representations having different qualities included in a same content, when an amount of the traffic in a network managed by the communication network device exceeds a threshold value, modulating the metadata to exclude information on at least one of the representations from the metadata, and transmitting the modulated metadata to clients located in the network.

In accordance with another aspect of the present disclosure, a method for controlling traffic by a client in a multimedia content transmission system is provided. The method includes receiving metadata including information on representations provided from a content providing server, included in a same content, and having different qualities, receiving information on a maximal bandwidth used for receiving the content from a communication network device, selecting at least one representation having a bandwidth equal to or smaller than the maximal bandwidth among the representations corresponding to the information included in the metadata, and transmitting a message for a request to provide the at least one selected representation, to the content providing server through the communication network device.

In accordance with another aspect of the present disclosure, a method of controlling traffic of a communication network device in a multimedia content transmission system is provided. The method includes determining whether an amount of the traffic in a network managed by the communication network device exceeds a threshold value, when the amount of the traffic exceeds the threshold value, transmitting information on a maximal bandwidth used for receiving content, to clients located in the network, transmitting, to the clients, content according to the maximal bandwidth provided from a content providing server according to a request of the clients.

In accordance with another aspect of the present disclosure, a communication network device in a multimedia content transmission system is provided. The communication network device includes a reception unit configured to receive, from a content providing server, metadata including information on representations included in the same content and different qualities, a controller configured to modulate the metadata to exclude information on at least one of the representations from the metadata when an amount of traffic in a network managed by the communication network device exceeds a threshold value, and a transmission unit configured to transmit the modulated metadata to clients located in the network.

In accordance with another aspect of the present disclosure, a client in a multimedia content transmission system is provided. The client includes a reception unit configured to receive metadata including information on representations provided from a content providing server, included in a same content, and having different qualities, and receives information on a maximal bandwidth used for receiving content from a communication network device, a controller configured to select at least one representation having a bandwidth equal to and smaller than the maximal bandwidth, among the representations corresponding to the information included in the metadata, and a transmission unit that configured to transmit a message for a request to provide the at least one selected representation, to the content providing server, through the communication network device.

In accordance with another aspect of the present disclosure, a communication network device in a multimedia content transmission system is provided. The communication network device includes a controller configured to determine whether an amount of traffic in a network managed by the communication network device exceeds a threshold value, and a transmission unit configured to transmit information on a maximal bandwidth used for receiving content when the amount of the traffic exceeds the threshold value, and to transmit the content according to the maximal bandwidth provided from a content providing server, to the clients, according to requests of the clients.

The present disclosure can mitigate traffic reduction generated due to an excessive connection increase of clients in a multimedia content transmission system using DASH technology.

Further, the present disclosure can mitigate traffic preoccupancy by a client in a multimedia content transmission system using DASH technology.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which.

Throughout the drawings, it should be noted that like reference numbers are used to depict the same or similar elements, features, and structures.

DETAILED DESCRIPTION

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

The present disclosure proposes a method of adjusting traffic between a server and a client by a network provider in order to mitigate traffic preoccupancy by the client.

Figure 1:
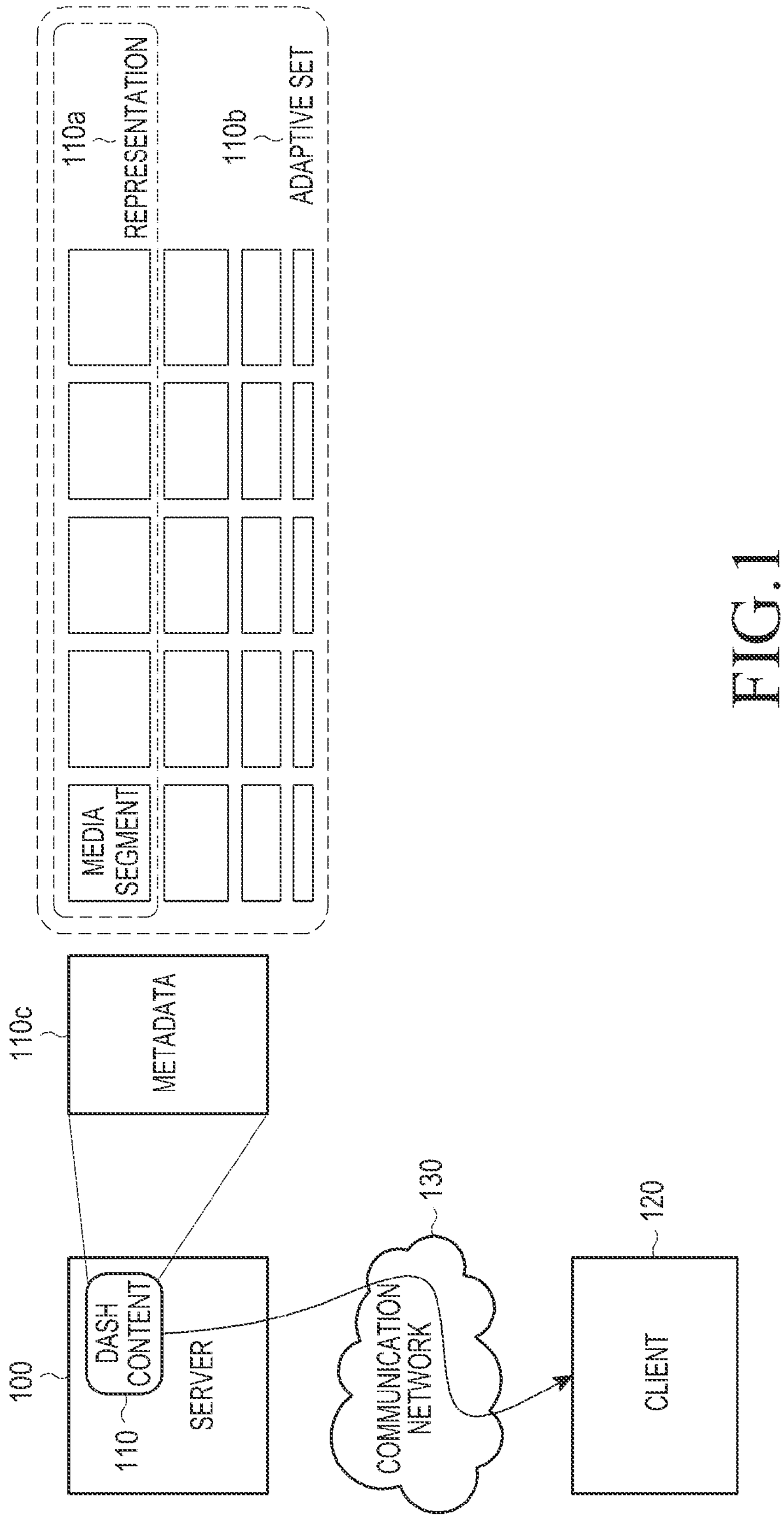
FIG. 1 is a block diagram illustrating a broadcasting communication system using the Dynamic Adaptive Streaming over Hypertext Transfer Protocol (HTTP) (DASH) technology according to the related art.
Figure 2:
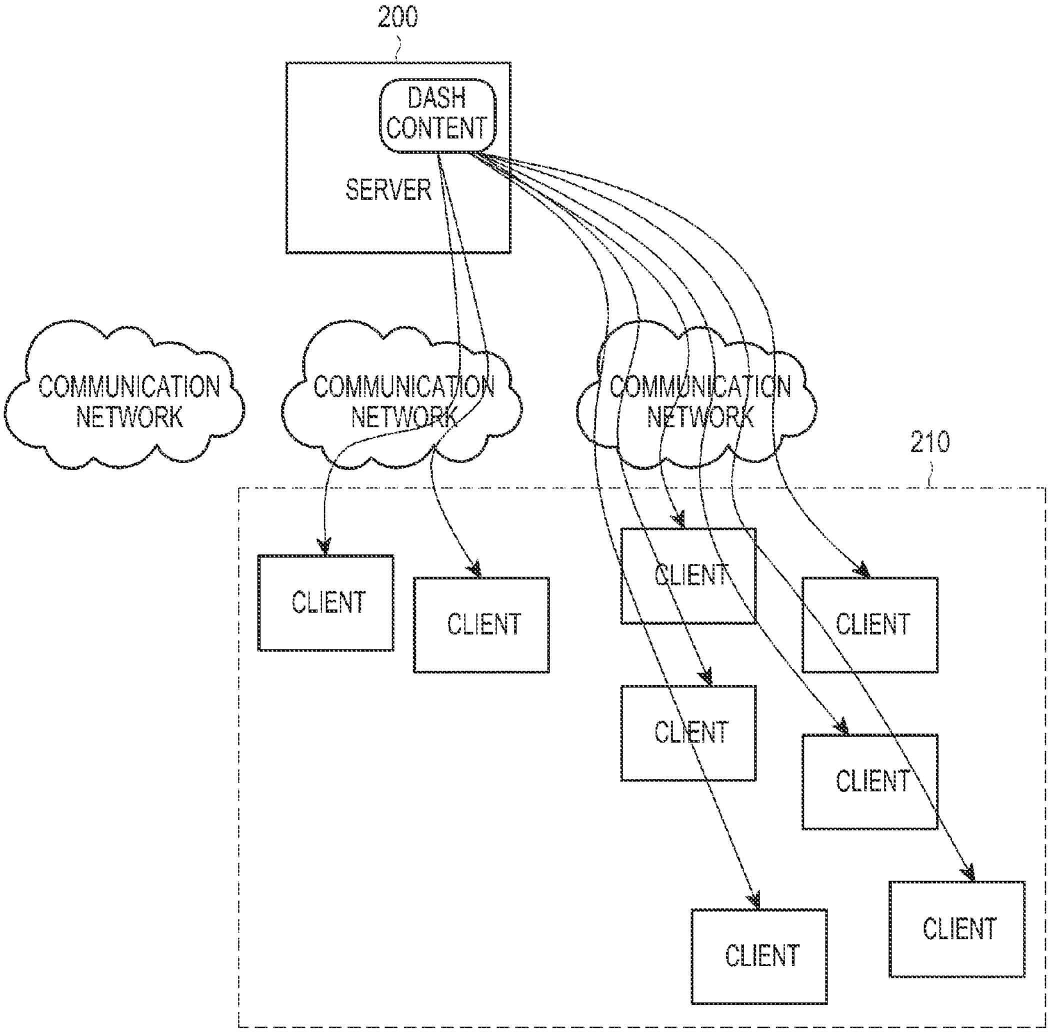
FIG. 2 illustrates an example where DASH content is provided, in a broadcasting communication system according to the related art.
Figure 3:
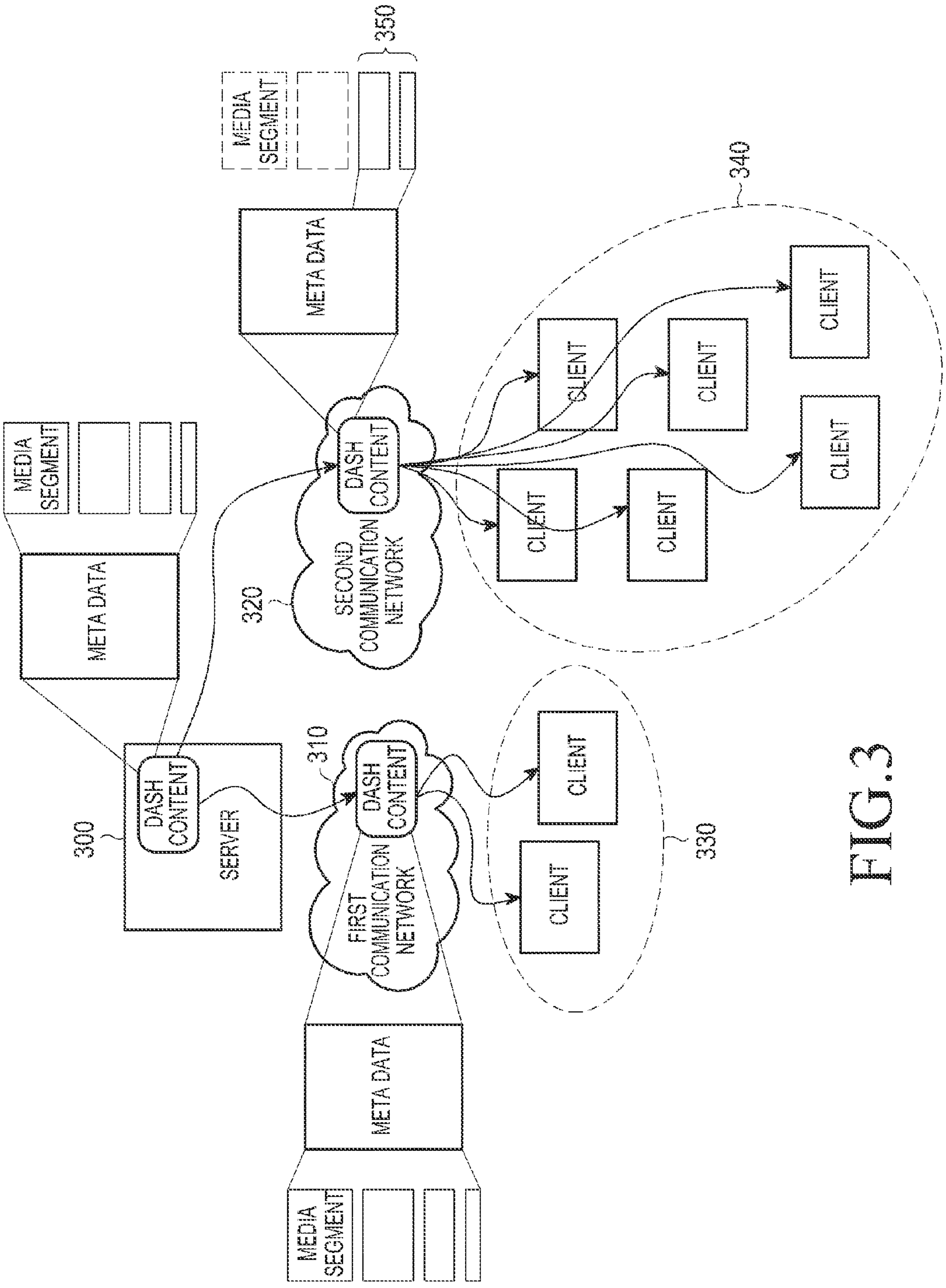
FIG. 3 is a block diagram illustrating a multimedia content transmission system according to an embodiment of the present disclosure.

FIG. 3 is a block diagram illustrating a multimedia content transmission system according to an embodiment of the present disclosure.

Referring to FIG. 3, a multimedia content transmission system includes a server 300, a plurality of clients 330 which receives dynamic adaptive streaming over hypertext transfer protocol (HTTP) (DASH) content from the server 300 through a first communication network 310, and a plurality of clients 340 which receives DASH content from the server 300 through a second communication network 320.

When an amount of traffic of each of the corresponding networks exceeds a predetermined value, the first communication network 310 and the second communication network 320 modulate metadata provided from the server 300 to provide, to the plurality of clients 340, information on a part of an entire adaptation set and a representation which the client can select. For example, FIG. 3 illustrates metadata modulated such that the second communication network 320 includes information on a part of adaptation sets and the representation 350.

Meanwhile, the metadata can be modulated as long as the server 300 does not require separate integrity, and the modulated metadata may be configured in various forms in which compatibility for a DASH standard is secured.

Each of the plurality of clients 340 detects information on the adaptive set and the representation from the metadata received from the second communication network 320, and reproduces a media segment corresponding to the detected information. That is, each of the plurality of clients 340 reproduces the media segment based on less than the entire adaptive set and the entire representation, which are provided from the server 300. Thus, a bandwidth, which each client can use, is adjusted, so that traffic control can be performed.

Next, each of the nodes included in a communication network according to an embodiment of the present disclosure will be described with reference to FIG. 4.

Figure 4:
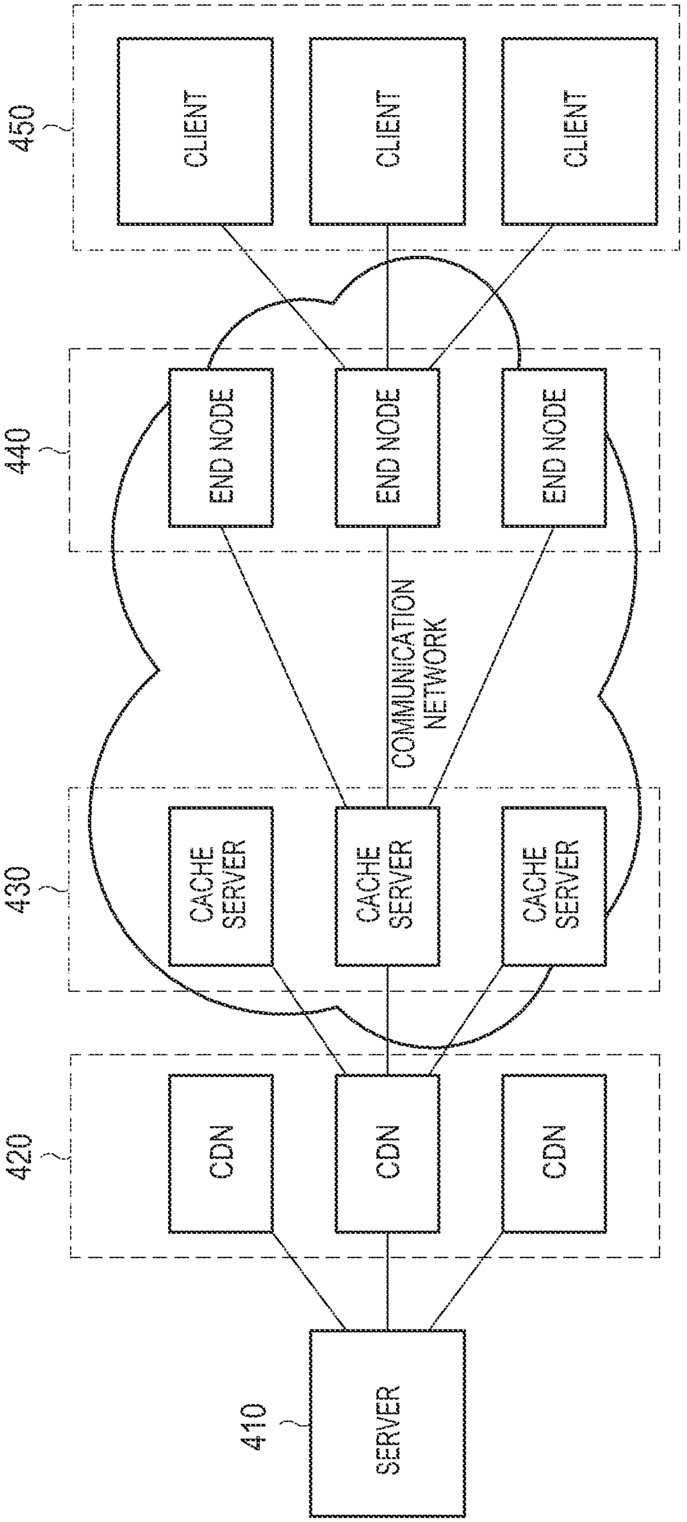
FIG. 4 illustrates nodes included in a communication network between a server and a client, in a multimedia content transmissions system, according to an embodiment of the present disclosure.

FIG. 4 illustrates nodes included in a communication network between a server and a client, in a multimedia content transmissions system, according to an embodiment of the present disclosure.

Referring to FIG. 4, a content delivery network (CDN) 420, a cache server 430, and an end node 440 may be included between a server 410 providing content and a plurality of clients 450 reproducing the content.

The CDN 420 is used such that the server 410 smoothly provides the content. The CDN 420 rapidly provides data according to the content requirement by storing a plurality of pieces of the content received from the server 410 in a plurality of data servers.

The cache server 430 is used for a processing requirement repeated several times for the same content. For example, when different clients require the same content, the cache server 430 can provide, to the client, data according to the corresponding content, without transmitting a content request to the CDN 420 or the server 410.

The end node 440 can be directly connected to the client 450, and can monitor a traffic situation of each client and an entire traffic situation. Further, the end node 440 can perform traffic control by transmitting the monitoring result for the traffic situation to the cache server 430. That is, the end node 440 transmits information on whether the amount of the traffic exceeds a threshold value (or, information on the amount of the traffic), to the cache server 430.

Then, the cache server 430 determines whether the amount of the traffic exceeds the threshold value based on the information received from the end node 440. When the amount of the traffic exceeds the threshold value, the cache server 430 modulates metadata stored therein, or metadata of the server 410 received from the CDN 420, to transmit information on the entire adaptive set and a part of the representation, to the client 450. When the amount of the traffic does not exceed the threshold value, the cache server 430 modulates metadata stored therein, or metadata of the server 410 received from the CDN 420, to transmit information on the entire adaptive set and the representation, to the client 450.

Next, a process of modulating metadata by the cache server 430 will be described as an example in consideration of a case where a plurality of nodes exist in a communication network as illustrated in FIG. 4.

Figure 5:
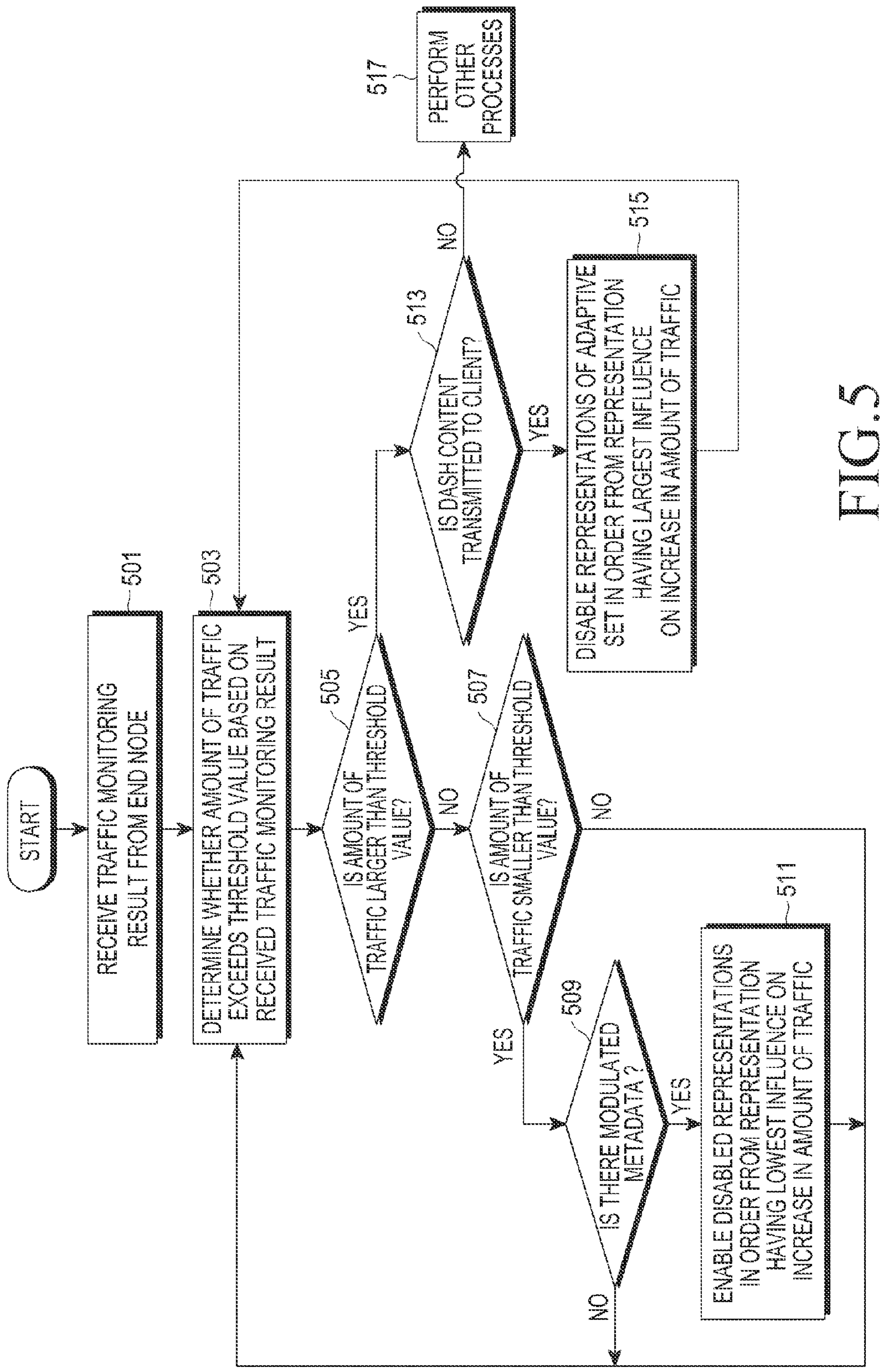
FIG. 5 is a flowchart illustrating a method of modulating metadata according to an embodiment of the present disclosure.

FIG. 5 is a flowchart illustrating a method of modulating metadata according to an embodiment of the present disclosure.

Referring to FIG. 5, in operation 501, the cache server 430 receives, from the end node 440, a traffic monitoring result of the network. Here, the traffic monitoring result may include information on an amount of traffic in the corresponding network, information on whether the amount of the traffic exceeds a threshold value, etc.

The cache server 430 may determine the threshold value (which may be used as a criterion for estimating an optimal amount of the traffic in the network) for the amount of the traffic for each end node. Accordingly, in operation 503, the cache server 430 determines whether the amount of the traffic exceeds the threshold value based on the received traffic monitoring result. When it is determined in operation 505 that the amount of the traffic exceeds the threshold value, the cache server 430 proceeds to operation 513 to determine whether DASH content is transmitted to the client 450 or not.

When the DASH content is being transmitted, in operation 515, the cache server 430 disables the representations of the adaptive set in order, starting from the representation having the largest influence on an increase in the amount of the traffic. Here, disabling of the representation implies an operation of excluding information on the corresponding representation from the metadata. Further, the cache server 430 can identify the representation having the largest influence on the increase in the amount of the traffic among the representations included in the corresponding adaptive set, based on the size of the bandwidth, etc. Thereafter, the cache server 430 returns to operation 503.

Meanwhile, when the DASH content is not transmitted in operation 513, the cache server 430 proceeds to operation 517 to perform other processes.

When it is determined in operation 507 that the amount of the traffic is smaller than the threshold value, in operation 509, the cache server 430 determines whether there is the modulated metadata. Further, when there is the modulated metadata, the cache server 430 proceeds to operation 511 to enable the disabled representations in order from the representation having the smallest influence on the increase in the amount of the traffic. Here, enabling of the representations implies an operation of including the information on the corresponding representation in the metadata. Further, the cache server 430 can identify the representation having the smallest influence on the increase in the amount of the traffic, among the representations included in the corresponding adaptive set, based on the size of the bandwidth, etc.

Meanwhile, when there is no modulated metadata, the cache server 430 returns to operation 503.

As a result, when the amount of the traffic exceeds the threshold value, the cache server 430 may disable the representations in order from the representation having the large influence on the increase in the amount of the traffic until the amount of the traffic becomes equal to the threshold value. Further, when the amount of the traffic is smaller than the threshold value, the cache server 430 may enable the disabled representations in order starting from the representation having the smallest influence on the increase in the amount of the traffic until the amount of the traffic becomes equal to the threshold value.

Next, a scheme of modulating metadata for traffic control according to an embodiment of the present disclosure will be described. The scheme of modulating the metadata for the traffic control may include a scheme of modulating the metadata while maintaining context of the DASH content, and a scheme of modulating the metadata while not maintaining the context of the DASH content.

First of the two schemes, the scheme of modulating the metadata while maintaining the context of the DASH content will be described.

The metadata may include information on a period, an adaptive set, a representation, etc.

Elements of the content provided in the same time period are included for each adaptive set under the period information.

A row of the media segments having different qualities, for one element of the content provided to the same context, is included as the representation under the adaptive set.

Thus, the representations included in one adaptive set have different qualities while maintaining the context of the DASH content. Thus, the representations may be disabled and enabled for modulating the metadata for maintaining the context of the DASH content.

The representations include a property such as a bandwidth which is mandatory, and properties such as quality ranking (for example, indicating high quality as the quality ranking value is small), a width, a height, a frame-rate, a scan-type, etc. which are optional.

The bandwidth property among the aforementioned properties may be used for identifying the representation having the largest influence on the increase in the amount of the traffic. That is, the representations having the large influence on the increase in the amount of the traffic can be identified in order, starting from the representation having the large bandwidth. When there are the representations having the same bandwidth, the representations having the large influence on the increase in the amount of the traffic can be identified in order by using at least one of the optional properties.

Meanwhile, in order to disable the representations, names of the elements of the metadata configured by an extensible markup language (XML) may be changed or annotated.

For example, the names of the elements of the metadata may be changed as follows in order to disable </Representation> which is an end tag of the <Representation> in the metadata. That is, the term "</Representation>" which is not used in the DASH technology may be changed as described in Table 1.

TABLE 1

| Disabling method | Changing content (Example) |
|---|---|
| Annotation (Use annotation signs "!-" and "---") | <!–resentation> . . . </resentation--->) |
| Substitution (Change some characters of the Representation into other Alphabets or Signs) | <_epresentattion> . . . </_epresentation> → However, the changed names should correspond to name not used in the DASH technology |

Meanwhile, a method of restoring the names of the annotated or substituted elements to their original names may be used for the enabling operation.

Next, a scheme of modulating the metadata while not maintaining the context of the DASH content will be described.

The adaptive set of the elements of the DASH content provides one media component (e.g., audio or video) and a role descriptor. The role descriptor may have a value of a main (used when other information is not provided) or a value of an alternative (having the same media component type as that of the main and used as a substitution for the main), and may instruct a role for whether specific audio and specific video are used as the main or the alternative.

Thus, when the values of the main and the alternative are provided through the role descriptor, all of the representations having the values of the main and the alternative should be disabled.

The reason is that the client reproduces one of the representations having the values of the main and the alternative, so that when the representations are disabled without distinction of the values of the main and the alternative, a traffic control effect according to the metadata modulation cannot be obtained. Further, the reason is that other contexts are provided to the client so that a result which both the communication network and the client do not want may occur.

When the metadata is modulated by identifying all of the values of the role descriptor of the same media component, one of the video and the audio may not be reproduced. Such a situation may occur when a network speed is lowered, due to characteristics of the DASH technology, so that the client may perform the modulated operation without a special functional problem.

Meanwhile, when different DASH contents are provided, the network provider may determine which DASH content is modulated.

In a situation where traffic control is needed, although the end node may modulate all of the DASH contents, the traffic is not immediately lowered even when the DASH contents are modulated.

Thus, it is proper to select the DASH contents to be modulated, in an order starting from the DASH content having a short minimumUpdatePeriod, by identifying minimumUpdatePeriod information in the metadata.

The reason is that, when the minimumUpdatePeriod is short, the time during which the client updates the metadata is shortened, so that a probability to influence a client operation through the modulation of the metadata increases by an amount corresponding to the shortened time.

When there is no minimumUpdatePeriod information in the metadata, the client may not update the previously downloaded metadata until the reproduction is completed. In this case, even when the metadata is changed in the communication network, an operation of the client is not influenced.

Hereinabove, the method of performing the traffic control through the metadata modulation in the communication network has been described. Hereinafter, a method of performing traffic control by the client will be described.

Figure 6:
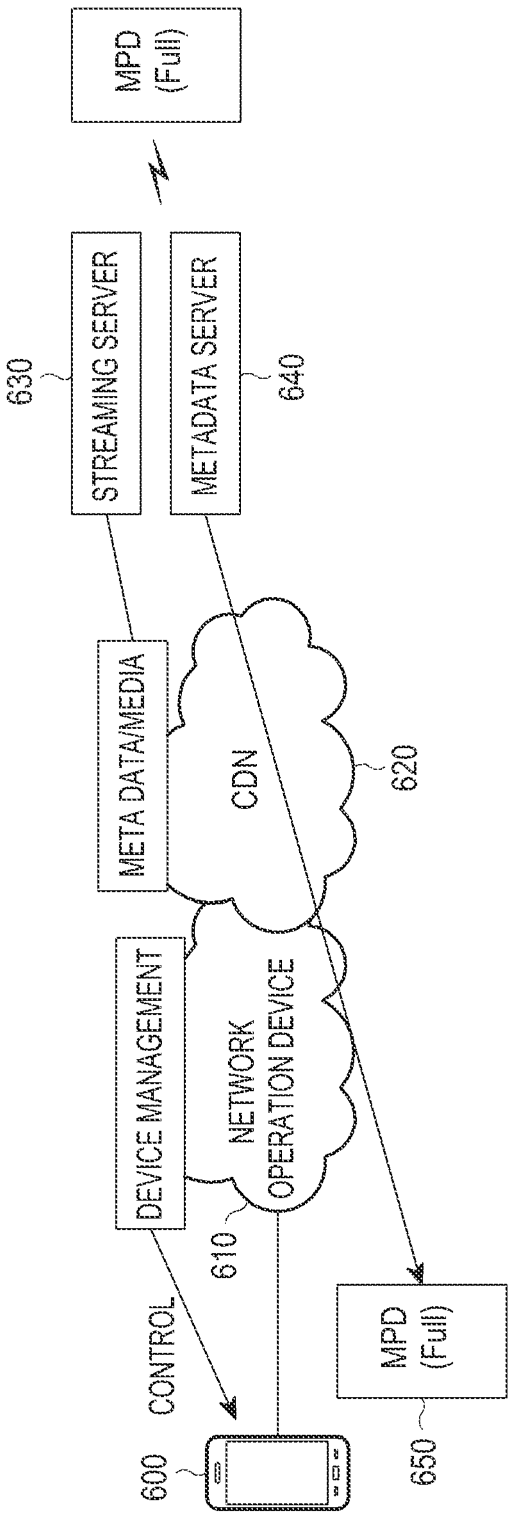
FIG. 6 illustrates a network configuration which can perform traffic control by a client according to an embodiment of the present disclosure.

FIG. 6 illustrates a network configuration that can perform traffic control by a client according to an embodiment of the present disclosure.

Referring to FIG. 6, a client 600 includes a network operation device 610 for performing device management for the client, a CDN 620 for transmitting a metadata/media segment, a streaming server 630 for providing content, and a metadata server 640 for providing metadata 650.

The client 600 receives complete metadata (metadata including the entire adaptive set and the representation) 650 for the corresponding content service. Further, the network operation device 610 determines a traffic situation in the network, and when traffic control is required, transmits a message for the traffic control, to the client 650. The message for the traffic control corresponds to a message for instruction to use a part of the representation in the entire adaptive set included in the metadata.

Hereinafter, a method of controlling traffic in a network configured in this way will be described in detail with reference to FIG. 7.

Figure 7:
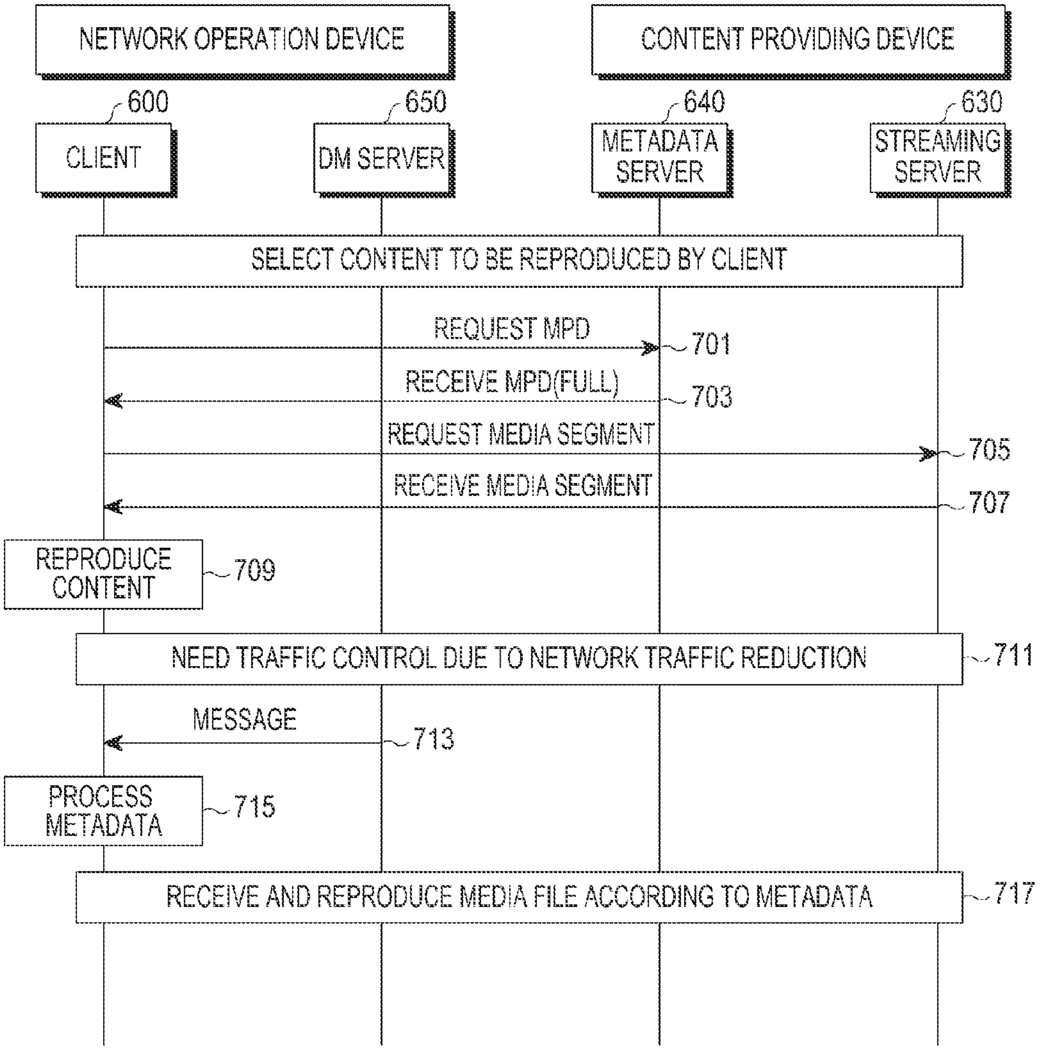
FIG. 7 is a signal flow diagram illustrating a traffic control process for an adaptive streaming service according to an embodiment of the present disclosure.

FIG. 7 is a signal flow diagram illustrating a traffic control process for an adaptive streaming service according to an embodiment of the present disclosure.

Referring to FIG. 7, a client 600 selects content to be reproduced, through a server such as a portal of a provider, and in operation 701, requests a metadata server 640 to transmit media presentation description (MPD) information as metadata. Further, in operation 703, the client 600 receives the MPD from the metadata server 640. Here, the MPD is not changed, and includes an entire adaptive set and a representation.

The client 600 selects media segment of the representation to be received, based on the received MPD, and in operation 705, requests a streaming server 630 to provide the selected media segment. Next, the client 600 receives the requested media segment from the streaming server 630 in operation 707, and in operation 709 reproduces the corresponding content. Operations 701 to 709 are the same as that of a general adaptive streaming scheme.

Meanwhile, when traffic is overloaded in the network while the client 600 receives the content, a DM server 650 corresponding to a network operation device 610 determines whether traffic control is needed, in operation 711.

When it is determined that the traffic control is needed, the DM server 650 transmits a message including information on a maximal bandwidth to the client 600 in order to perform the traffic control, in operation 713. At this time, the DM server 650 transmits the message to all of the clients in the network.

Then, the client 600 receives the message to detect the information on the maximal bandwidth, and processes the metadata, in operation 715. That is, the client 600 identifies the representation having a bandwidth smaller than the maximal bandwidth based on the metadata, and then in operation 717, the client 600 receives and reproduces a media segment for the identified representation.

While the present disclosure has been shown and described with reference to various embodiments thereof, it will be understood by those skilled in the art that various changes in form and details may be made therein without departing from the spirit and scope of the present disclosure as defined by the appended claims and their equivalents.

The invention claimed is:

1. A method for controlling traffic by a network server in a content transmission system, the method comprising:

receiving, from a content server, representations and metadata including information on the representations, the representations and the metadata being included in a content;

measuring an amount of the traffic managed by the network server;

determining whether the amount of the traffic is greater than a threshold value;

modulating the metadata by disabling information on at least one of the representations of the content;

modulating, if the amount of the traffic is greater than the threshold value, the representations based on the disabled information on the at least one of the representations;

generating a modulated content comprising the modulated metadata and the modulated representations; and transmitting, to a client, the modulated content, wherein the information on the at least one of the representations is disabled based on a largest bandwidth size of the representations.

2. The method of claim 1, wherein the at least one of the representations is selected based on the bandwidth size of the representations.

3. The method of claim 2, wherein, if the selected at least one of the representations has a same bandwidth, the at least one of the representations is reselected among the selected at least one of the representations based on at least one of quality information, width information, height information, or frame rate information.

4. The method of claim 1, further comprising:

if the amount of the traffic is smaller than the threshold value, modulating the metadata by enabling the information on the at least one of the representations of the content, and representations based on the enabled information on the at least one of the representations.

5. The method of claim 4, wherein the modulating of the metadata is performed if there is metadata modulated by disabling the information on the at least one of the representations.

6. The method of claim 1, wherein the modulating of the metadata is performed if the metadata has a minimum update period.

7. The method of claim 1, wherein, until the amount of the traffic is not greater than the threshold value, the metadata is modulated by disabling the information on the at least one of the representations.

8. A method for controlling traffic by a client in a content transmission system, the method comprising:

receiving, from a content server, representations and metadata including information on the representations through a network server, the representations and the metadata being included in a content;

receiving, from the network server, information on a maximal bandwidth available for receiving the content if an amount of the traffic managed by the network server is greater than a threshold value;

modulating the metadata by disabling information on at least one of the representations of the content based on the information on the maximal bandwidth; and modulating the representations based on the disabled information on the at least one of the representations, the modulated representations having a bandwidth equal to or smaller than the maximal bandwidth;

transmitting, to the network server, a message for a request to provide a modulated content corresponding to the modulated metadata and the modulated representations; and receiving, from the network server, the modulated content, wherein the information on the at least one of the representations is disabled based on a largest bandwidth size of the representations.

9. The method of claim 8, further comprising:

modulating the metadata by enabling the information on the at least one of the representations of the content, and representations based on the enabled information on the at least one of the representations if the amount of the traffic is smaller than the threshold value.

10. A method of controlling traffic by a network server in a content transmission system, the method comprising:

determining whether an amount of the traffic managed by the network server is greater than a threshold value;

transmitting, to a client, if the amount of the traffic is greater than the threshold value, information on a maximal bandwidth available for receiving a content which includes metadata and representations, the metadata being modulated by disabling information on at least one of the representations of the content based on the information on the maximal bandwidth, the representations being modulated based on the disabled information on the at least one of the representations, and the modulated representations having a bandwidth equal to or smaller than the maximal bandwidth;

receiving, from the client, a message for a request to provide a modulated content which comprises the modulated metadata and the modulated representations; and transmitting, to the client, the modulated content, wherein the information on the at least one of the representations is disabled based on a largest bandwidth size of the representations.

11. A network server for controlling traffic in a content transmission system, the network server comprising:

a memory configured to store instructions therein;

a receiver configured to receive, from a content server, representations and metadata including information on the representations, the representations and the metadata being included in a content;

a processor that, when the instructions are executed, is configured to:

measure an amount of the traffic managed by the network server, determine whether the amount of the traffic is greater than a threshold value, modulate the metadata by disabling information on at least one of the representations of the content and modulate the representations based on the disabled information on at least one of the representations if the amount of the traffic is greater than the threshold value, and generate a modulated content including the modulated metadata and the modulated representations; and a transmitter configured to transmit, to a client, the modulated content, wherein the information on the at least one of the representations is disabled based on a largest bandwidth size of the representations.

12. The network server of claim 11, wherein the at least one of the representations is selected based on the bandwidth size of the representations.

13. The network server of claim 12, wherein, if the selected at least one of the representations has a same bandwidth, the at least one of the representations is reselected among the selected at least one of the representations based on at least one of quality information, width information, height information or frame rate information.

14. The network server of claim 11, wherein the processor is further configured to:

if the amount of the traffic is smaller than the threshold value, modulate the metadata by enabling the information on the at least one of the representations of the content, and representations based on the enabled information on the at least one of the representations.

15. The network server of claim 14, wherein the processor is further configured to modulate the metadata, if there is metadata modulated, by disabling the information on the at least one of the representations.

16. The network server of claim 11, wherein the processor is further configured to modulate the metadata if the metadata has a minimum update period.

17. The network server of claim 11, wherein, until the amount of the traffic is not greater than the threshold value, the metadata is modulated by disabling the information on the at least one of the representations.

18. A client in a multimedia content transmission system, the client comprising:

a memory configured to store instructions therein;

a receiver configured to:

receive, from a content server, representations and metadata including information on the representations, the representations and metadata being included in a content, and receive, from the network server, information on a maximal bandwidth available for receiving the content if an amount of the traffic managed by the network server is greater than a threshold value;

a processor that, when the instructions are executed, is configured to:

modulate the metadata by disabling information on at least one of the representations of the content based on the information on the maximal bandwidth, and the representations based on the disabled information on the at least one of the representations, the modulated representations having a bandwidth equal to or smaller than the maximal bandwidth; and a transmitter configured to transmit, to the network server, a message for a request to provide a modulated content corresponding to the modulated metadata and the modulated representations, wherein the receiver is further configured to receive, from the network server, the modulated content, and wherein the information on the at least one of the representations is disabled based on a largest bandwidth size of the representations.

19. The client of claim 18, wherein the processor is further configured to modulate the metadata by enabling information on the at least one of the representations of the content, and representations based on the enabled information on the at least one of the representations, if the amount of the traffic is smaller than the threshold value.

20. A network server in a content transmission system, the network server comprising:

a memory configured to store instructions therein;

a processor that, when the instructions are executed, is configured to determine whether an amount of the traffic managed by the network server is greater than a threshold value;

a transmitter configured to transmit, to a client, information on a maximal bandwidth available for receiving a content which includes metadata and representations if the amount of the traffic is greater than the threshold value, the metadata being modulated by disabling information on at least one of the representations of the content based on the information on a maximal bandwidth, the representations being modulated based on the disabled information on the at least one of the representations, and the modulated representations having a bandwidth equal to or smaller than the maximal bandwidth; and a receiver configured to receive, from the client, a message for a request to provide a modulated content which includes the modulated metadata and the modulated representations, wherein the processor is further configured to generate the modulated content, wherein the transmitter is further configured to transmit, to the client, the modulated content, and wherein the information on the at least one of the representations is disabled based on a largest bandwidth size of the representations.

* * * * *